(12) United States Patent
Thompson, Jr.

(10) Patent No.: US 6,205,950 B1
(45) Date of Patent: Mar. 27, 2001

(54) PET TOILET-LIKE WATER DISH AND FOOD STORAGE

(76) Inventor: James Cary Thompson, Jr., 1886 Champlain Dr., Corona, CA (US) 91720

( * ) Notice: Subject to any disclaimer, the term of this patent is extended or adjusted under 35 U.S.C. 154(b) by 0 days.

(21) Appl. No.: 09/375,187

(22) Filed: Aug. 16, 1999

(51) Int. Cl.[7] .............................. A01K 5/00; A01K 7/00
(52) U.S. Cl. ............................................ 119/51.5; 119/73
(58) Field of Search ............................... 119/51.5, 51.01, 119/52.1, 54, 61, 165, 166, 168, 73; D30/129

(56) References Cited

U.S. PATENT DOCUMENTS

| | | | |
|---|---|---|---|
| D. 368,790 | * | 4/1996 | Sternberg ............................ D99/37 |
| D. 392,075 | * | 3/1998 | Holt ................................... D30/129 |
| 4,134,365 | * | 1/1979 | Futers et al. ....................... 119/51.5 |
| 4,691,664 | | 9/1987 | Crowell . |
| 4,947,796 | * | 8/1990 | Robinette ............................ 119/51.5 |
| 5,005,524 | | 4/1991 | Berry . |
| 5,058,528 | * | 10/1991 | Counseller et al. .................. 119/165 |
| 5,138,980 | | 8/1992 | Ewing . |
| 5,156,113 | | 10/1992 | Sextro . |
| 5,404,838 | * | 4/1995 | Khan .................................. 119/52.1 |
| 5,730,082 | * | 3/1998 | Newman ............................. 119/51.5 |
| 5,904,117 | * | 5/1999 | Castro ................................. 119/51.5 |

* cited by examiner

Primary Examiner—Michael J. Carone
Assistant Examiner—Son T. Nguyen
(74) Attorney, Agent, or Firm—Michael I Kroll (57) ABSTRACT

The present invention 10 discloses a device for watering pets, e.g., a dog or cat. The device 10 has the general shape of a toilet. The device comprises a base 22, a bowl 12 for holding water 16, and a tank-like structure 18 for holding dry goods 32, e.g., dog food, which tank 18 also is equipped with a lid 20. A compartment 14 for holding a heating media 36, e.g., gel, is shown underneath the bowl 12 in order to heat the bowl. An alternative embodiment discloses a bowl 12 with a seat 34 with hinges 38 on top of the bowl 12 which seat 34 is selectively placed in the up or down position.

15 Claims, 9 Drawing Sheets

PET TOILET-LIKE WATER DISH AND FOOD STORAGE

FIELD OF THE INVENTION

The present invention relates generally to pet watering dishes and, more specifically, to a pet watering dish that substantially conforms in appearance to a toilet having a removable compartment at the base of the bowl portion of the toilet for inserting therein either a solid, liquid, or gel pak for the purposes of varying the temperature of the liquid within the bowl portion of said toilet. Further, said toilet watering dish having another compartment within the tank portion of the toilet having a removable detachable lid for the purposes of storing an amount of dry goods therein.

DESCRIPTION OF THE PRIOR ART

There are other pet watering dishes designed to vary the temperature of the contents. Typical of these is U.S. Pat. No. 4,691,664 issued to Crowell on Sep. 8, 1987.

Another patent was issued to Berry on Apr. 9, 1991 as U.S. Pat. No. 5,005,524. Yet another U.S. Pat. No. 5,138,980 was issued to Ewing on Aug. 18, 1992 and still yet another was issued on Oct. 20, 1992 to Sextro as U.S. Pat. No. 5,156,113.

A dish-like receptacle for serving liquids to small animals whereby a coolant source maintains the liquid at a reduced temperature over extended periods. The coolant source is a frozen gel which may be refrozen, regenerated or replaced as needed.

An apparatus including a pet watering dish including an upper cavity and a lower cavity wherein the lower cavity receives in a complementary manner a plate warmer therewithin. The plate warmer includes a plurality of heating coils operative in concert or individually for selective heating of the upper body cavity. A modification of the instant invention includes an exterior bowl wall positioned exteriorly of an interior bowl wall to define an internal fluid containing cavity therebetween with an exterior fluid moat defined between the exterior wall and the interior wall to prevent crawling insects from contamination of the interior bowl cavity. A heating element is positioned underlying the floor of the bowl.

An animal feeder is provided for delivering temperature-regulated liquid feed to one or more feed sites. A refrigerated or heated reservoir stores the liquid feed, and one two or three conduits lead from the reservoir to a feed dish which has a bowl portion and a heat exchange portion. A conduit supplies the bowl at a predetermined level. Conduits also circulate liquid through the heat exchange chamber which serves to cool or heat the solid and/or liquid feed in the bowl.

A container enclosure includes a top wall, with an opening directed therethrough receiving a bucket member therewithin for containing fluid for the use of pets. Prevention of freezing of water during depressed temperatures is effected by the enclosure utilizing thickly insulated walls, as well as a floor and top wall about the bucket member, with an illumination bulb directed into the enclosure chamber to maintain the water in an unfrozen state.

While these pet watering dishes may be suitable for the purposes for which they were designed, they would not be as suitable for the purposes of the present invention, as hereinafter described.

SUMMARY OF THE PRESENT INVENTION

The present invention discloses a device for watering pets, e.g., a dog or cat. The device has the general shape of a toilet. The device comprises a base, a bowl for holding water, and a tank-like structure for holding dry goods, e.g., dog food, which tank also is equipped with a lid. A compartment for holding a heating media, e.g., gel, is shown underneath the bowl in order to heat the bowl. An alternative embodiment discloses a bowl having a seat with hinges on top of the bowl which seat is selectively placed in the up or down position.

A primary object of the present invention is to provide a pet watering dish substantially conforming in appearance to a toilet.

Another object of the present invention is to provide a pet watering dish substantially conforming in appearance to a toilet having a compartment therewithin having a container for pouring and/or inserting a solid, liquid, or gel pak for the purposes of varying the temperature of the contents of the bowl portion of the toilet.

Yet another object of the present invention is to provide a pet watering dish substantially conforming in appearance to a toilet having a removable detachable lid on the tank portion of the toilet.

Still yet another object of the present invention is to provide a pet watering dish substantially conforming in appearance to a toilet having a compartment within the tank portion of the toilet having a removable detachable lid for the purposes of storing dry goods therewithin.

Additional objects of the present invention will appear as the description proceeds.

The present invention overcomes the shortcomings of the prior art by providing a pet watering dish that substantially conforms in appearance to a toilet having a removable compartment at the base of the bowl portion of the toilet for inserting therein either a solid, liquid, or gel pak for the purposes of varying the temperature of the liquid within the bowl portion of said toilet. Further, said toilet watering dish having another compartment within the tank portion of the toilet having a removable detachable lid for the purposes of storing an amount of dry goods therein.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

| | |
|---|---|
| 10 | present invention |
| 12 | dish or bowl |
| 14 | compartment |
| 16 | water |
| 18 | tank |
| 20 | tank lid |
| 22 | base |
| 24 | connecting member |
| 26 | tank support |
| 28 | drawer |
| 30 | handle |
| 32 | dry goods |
| 34 | bowl seat |
| 36 | heat device |
| 38 | hinge means |
| 40 | hot device |
| 42 | cold device |
| 44 | step |
| 46 | direction arrow |
| 48 | tray sides |
| 50 | tray walls |

DESCRIPTION OF THE PREFERRED EMBODIMENT(S)

Turning now descriptively to the drawings, in which similar reference characters denote similar elements throughout the several view, FIGS. 1 through 9 illustrate the present invention being a pet watering dish which is shaped like a toilet.

Figure 1:
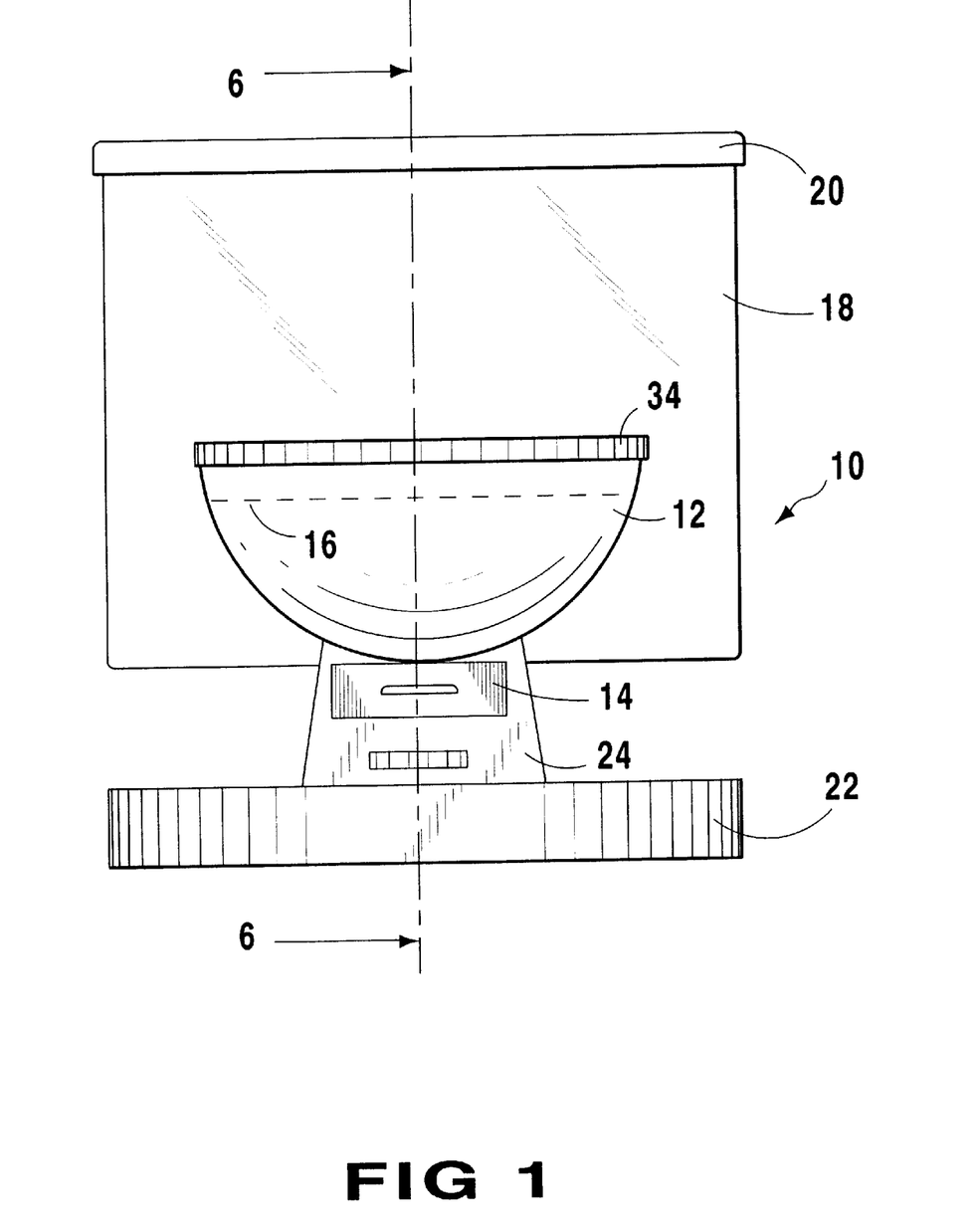
FIG. 1 is a front elevation of the present invention. Shown is a pet watering dish having the appearance of a toilet bowl having a drawer-like compartment wherein a solid, liquid, or gel pak can be inserted for varying the temperature of the liquid within the bowl, shown in dotted, area of the toilet. Also said pet water dish has a tank area wherein additional pet related items can be stored.

Turning to FIG. 1, shown therein is a front elevation of the present invention 10. Shown is a pet watering dish 12 having the appearance of a toilet bowl with seat 34 in the generally horizontal position on the periphery of the upper edge of bowl 12 having a drawer-like compartment 14 wherein a solid, liquid, or gel pak (not shown) can be inserted for varying the temperature of the liquid 16 within the bowl, shown in dotted, area of the toilet bowl 12. Also the pet water dish 12 has a tank 18 area behind the seat with a removable lid 20 thereon, wherein additional pet related items can be stored. Also shown is a base 22 which serves to keep the area around the bowl 12 clean along with a connecting member 24 attaching the base 22 to the bowl 12.

Figure 2:
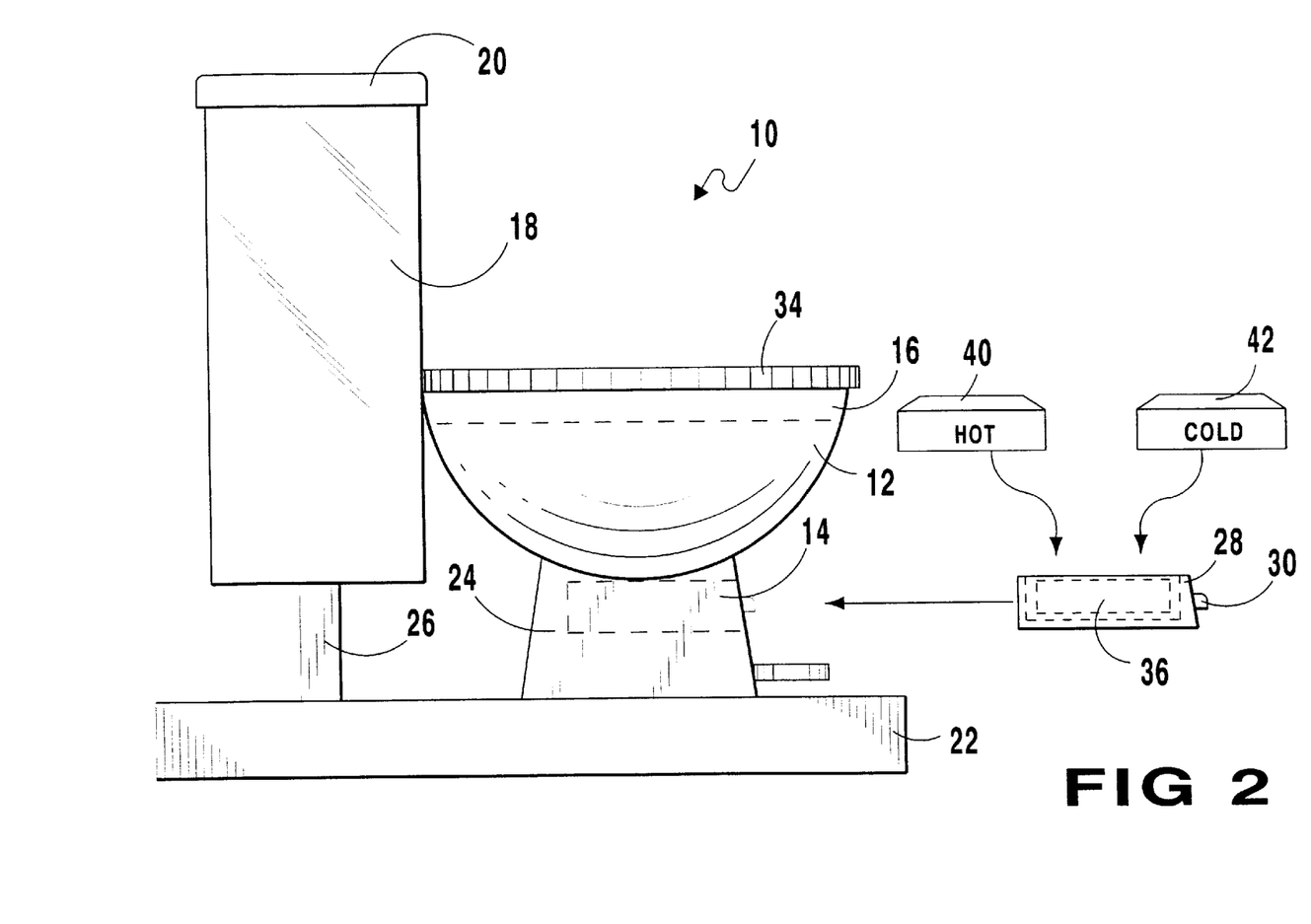
FIG. 2 is a side elevation of the present invention showing a pet watering dish having the appearance of a toilet. At the base of the bowl area there is a removable replaceable drawer-like compartment wherein a solid, liquid, or gel pak can be placed whereby the temperature of the liquid contained within the bowl area of the pet watering dish can be varied either higher or lower. Also shown is a tank area which can serve as another compartment for the storage of other pet related items such as medications to be administered with meals, dry dog food, chew toys, etc.

Turning to FIG. 2, shown therein is a side elevation of the present invention 10 showing a pet watering dish 12 having the appearance of a toilet. Near the base of the bowl area there is a removable replaceable drawer-like compartment 14 and slidably removable drawer 28 with handle 30 wherein a means for heat 40 or cold 42 being, e.g., a solid, liquid, or gel pak 36 can be placed whereby the temperature of the liquid 16 contained within the bowl area 12 of the pet watering dish can be varied either higher or lower. Also shown is a tank area 18 which can serve as another compartment for the storage of other pet related items such as medications to be administered with meals, dry dog food, chew toys, etc. Also shown is lid 20, base 22 and a support 26 for tank 18 and connecting member 24.

Figure 3:
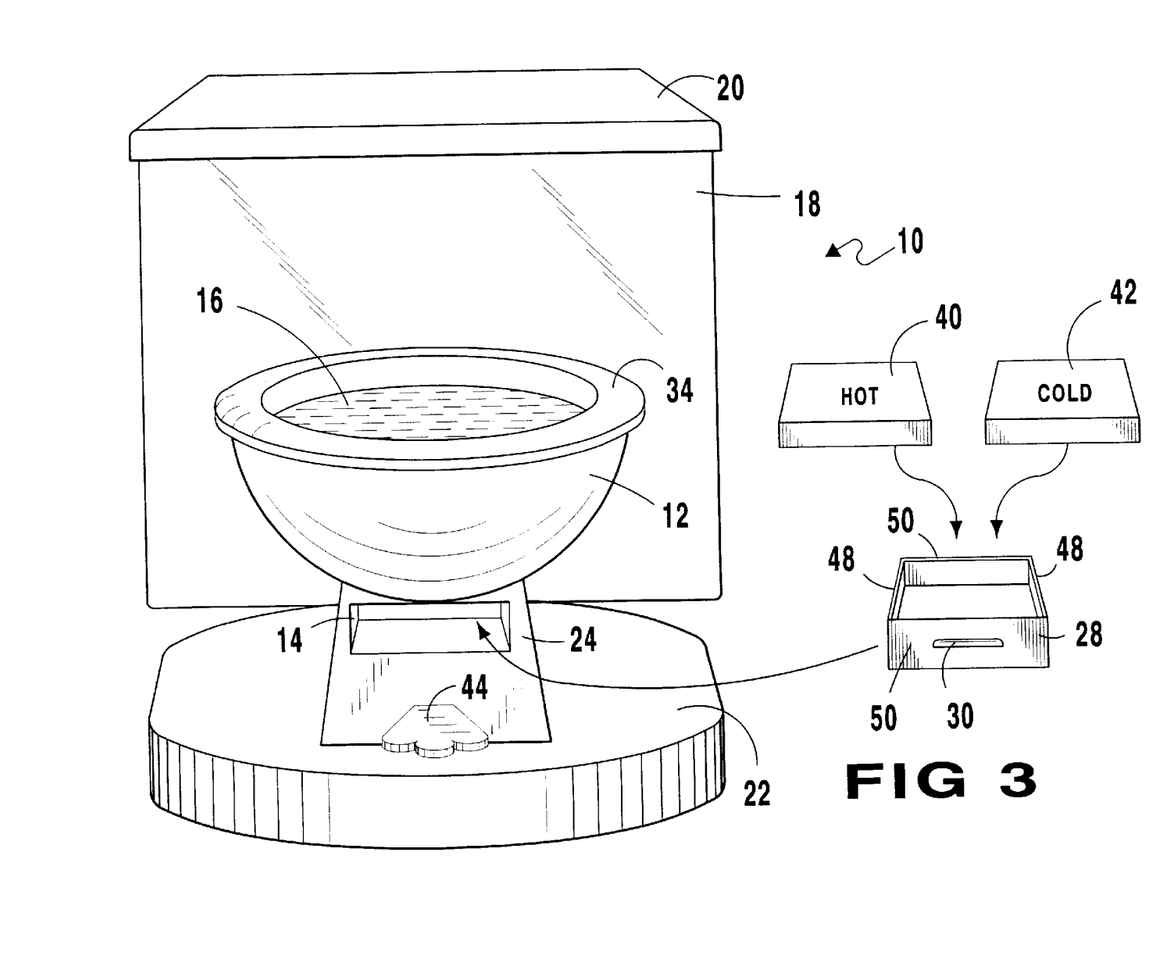
FIG. 3 is a front elevation of the present invention. Shown is a pet watering dish having the appearance of a toilet bowl having a bowl area containing a liquid and a removable replaceable drawer-like compartment wherein a solid, liquid, or gel pak can be placed whereby the temperature of the liquid with the bowl area can be varied either higher or lower. Also shown is a toilet tank area which can be used to store additional pet related items.

Turning to FIG. 3, shown therein is a front elevation of the present invention 10. Shown is a pet watering dish 12 having the appearance of a toilet bowl having a bowl area 12 containing a liquid 16 and a removable replaceable tray frame or drawer-like compartment 28 having upwardly extending sides 48 and end walls 50 wherein a solid, liquid, or gel pack, 40, 42 can be placed whereby the temperature of the liquid 16 with the bowl area 12 can be varied either higher or lower. Also shown is a toilet tank area 18 with lid 20 which can be used to store additional pet related items.

An animal paw-shaped step 44 is shown on the front of the connecting member 24 on which the animal using the present invention can place its front feet in order to place its mouth closer to liquid 16. Other elements previously disclosed are also shown.

Figure 4:
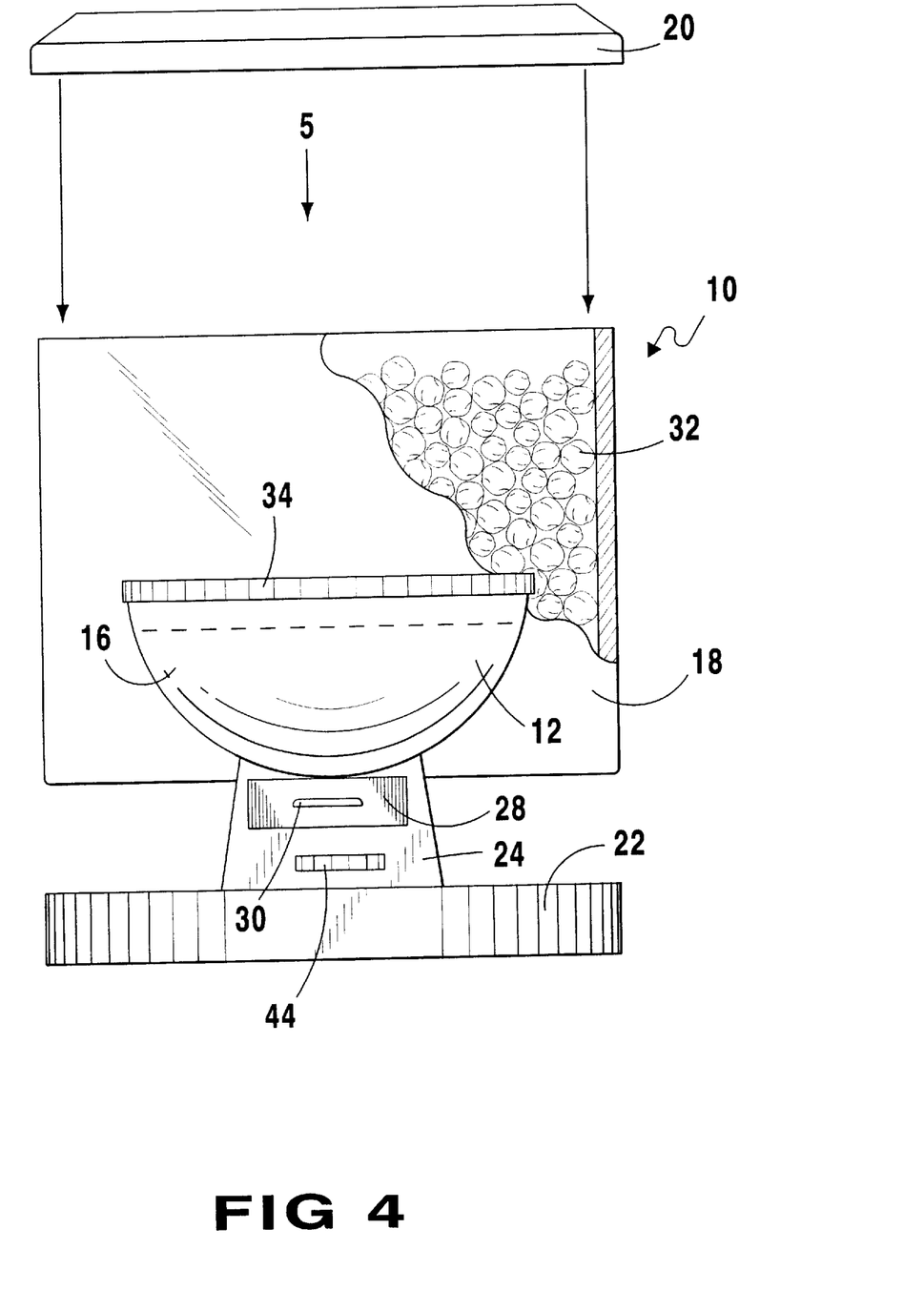
FIG. 4 is a front elevation of the present invention. Shown is a pet watering having the appearance of a toilet bowl having a drawer-like compartment wherein a solid, liquid, or gel pak can be inserted for varying the temperature of the liquid within the bowl area of the toilet. Also, shown is a cutaway view of the toilet tank being a separate compartment for the storage of dry goods and having a removable replaceable cover.

Turning to FIG. 4, shown therein is a front elevation of the present invention 10. Shown is a pet watering dish 12 having the appearance of a toilet bowl with seat 34 around its periphery having a drawer-like compartment 28 wherein a solid, liquid, or gel pak can be inserted for varying the temperature of the liquid 16 within the bowl area 12 of the toilet. Also, shown is a cutaway view of the toilet tank 18 being a separate compartment for the storage of dry goods 32 and having a removable replaceable cover 20.

Figure 5:
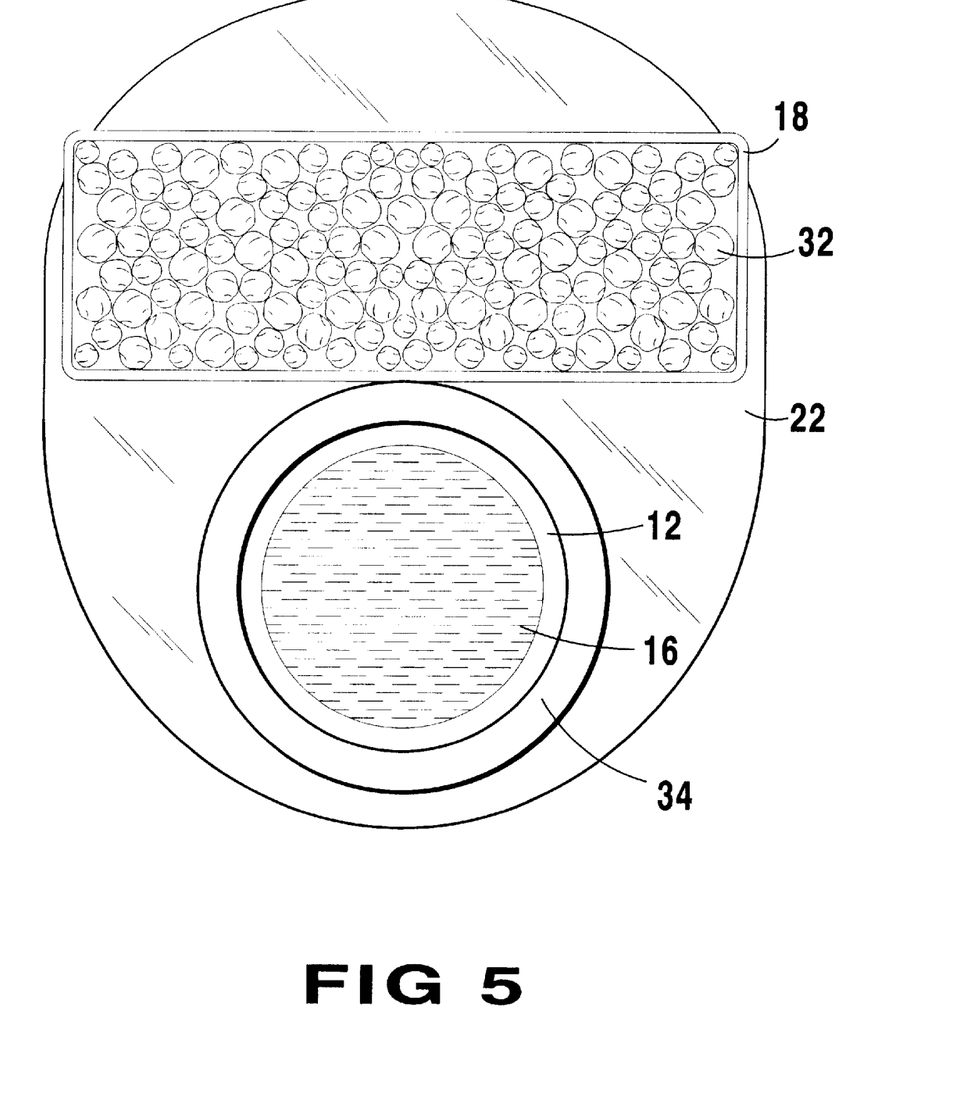
FIG. 5 is a top plan view, taken from FIG. 4 as indicated, of the present invention showing a bowl having a toilet seat wherein said bowl having water therein. Also shown is the top view of the tank having an amount of dry dog food contained therein.

Turning to FIG. 5, shown therein is a top plan view, taken from FIG. 4 as indicated, of the present invention showing a bowl 12 having a seat 34 wherein the bowl has water 16 therein. Also shown is the top view of the tank 18 having an amount of dry dog food 32 contained therein along with base 22.

Figure 6:
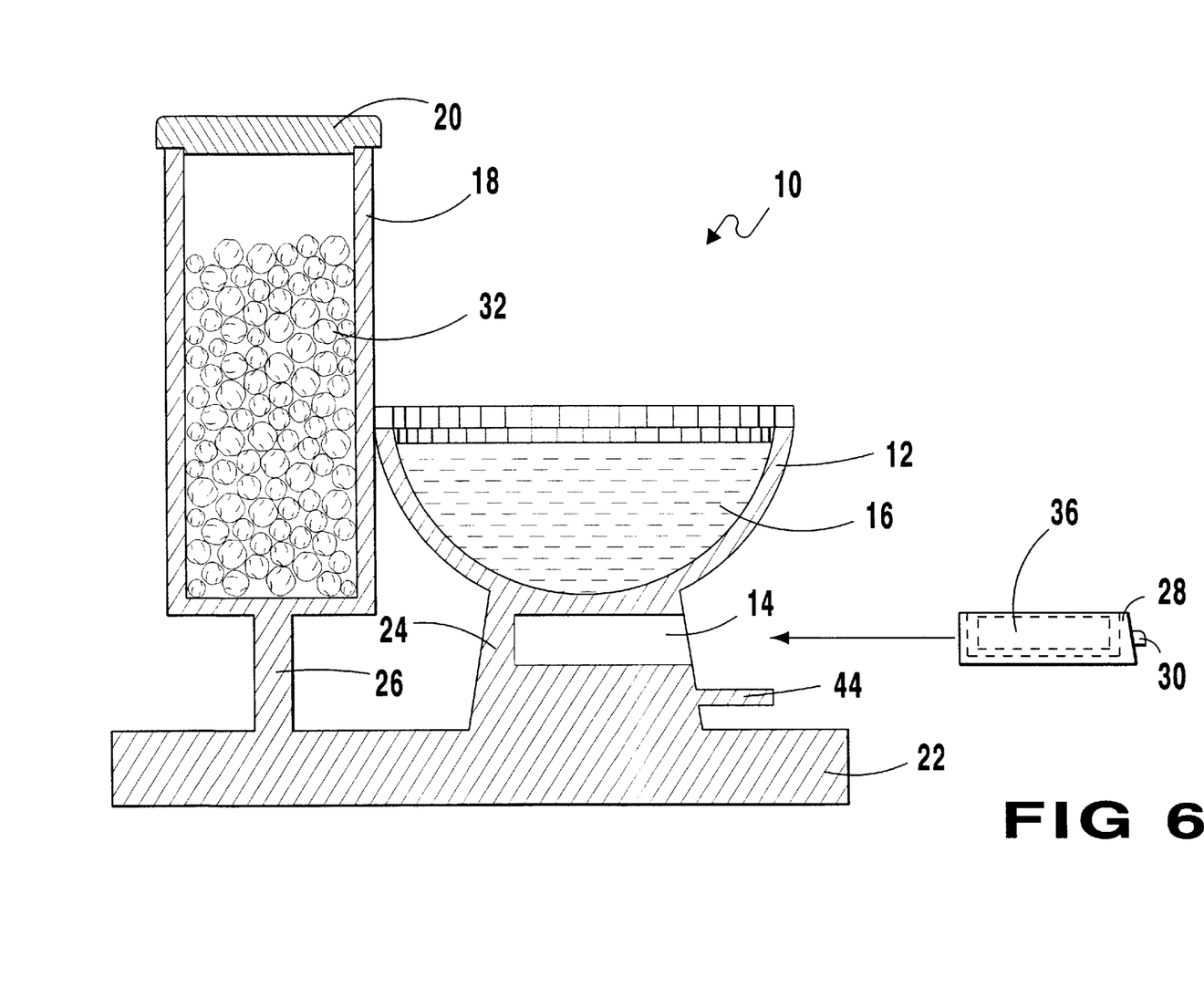
FIG. 6 is a cross sectional view, taken from FIG. 1 as indicated, of the present invention showing a bowl area having a compartment located thereunder wherein a drawer-like container can be inserted having a device located therein for varying the temperature of the bowl area. Also, shown is a tank area having a removable detachable cover having an amount of dry dog food contained therein.

Turning to FIG. 6, shown therein is a cross sectional view, taken from FIG. 1 as indicated, of the present invention 10 showing a bowl area 12 having a compartment 14 located thereunder and in close proximity thereto wherein a drawer-like container 28 with handle 30 can be inserted having a device 36 located therein for varying the temperature of the bowl area 12. Also, shown is a tank area 18 having a removable detachable cover 20 having an amount of dry dog food 32 contained therein. The present invention 10 may be made of ceramic or plastic-like material. Other elements previously disclosed are also shown.

Figure 7:
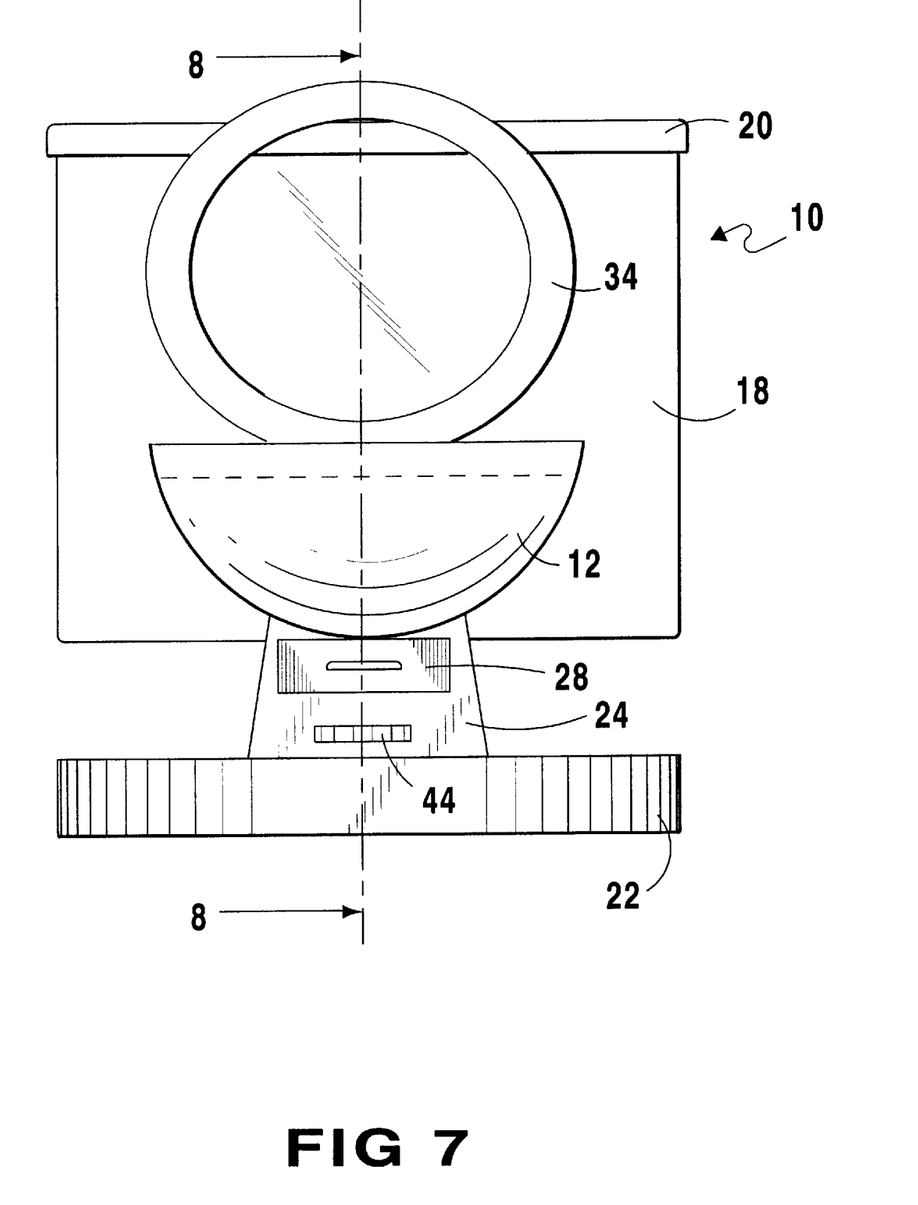
FIG. 7 is a front elevation of an alternate embodiment of the present invention. Shown is a pet watering dish having the appearance of a toilet bowl with the toilet seat in the raised position having a drawer-like compartment wherein a solid, liquid, or gel pak can be inserted for varying the temperature of the liquid within the bowl.

Turning to FIG. 7, shown therein is a front elevation of an alternate embodiment of the present invention 10. Shown is a pet watering dish 12 having the appearance of a toilet bowl with the bowl seat 34 in the raised position having a drawer-like compartment 28 wherein a solid, liquid, or gel pak can be inserted for varying the temperature of the liquid within the bowl 12. Other elements previously disclosed are also shown.

Figure 8:
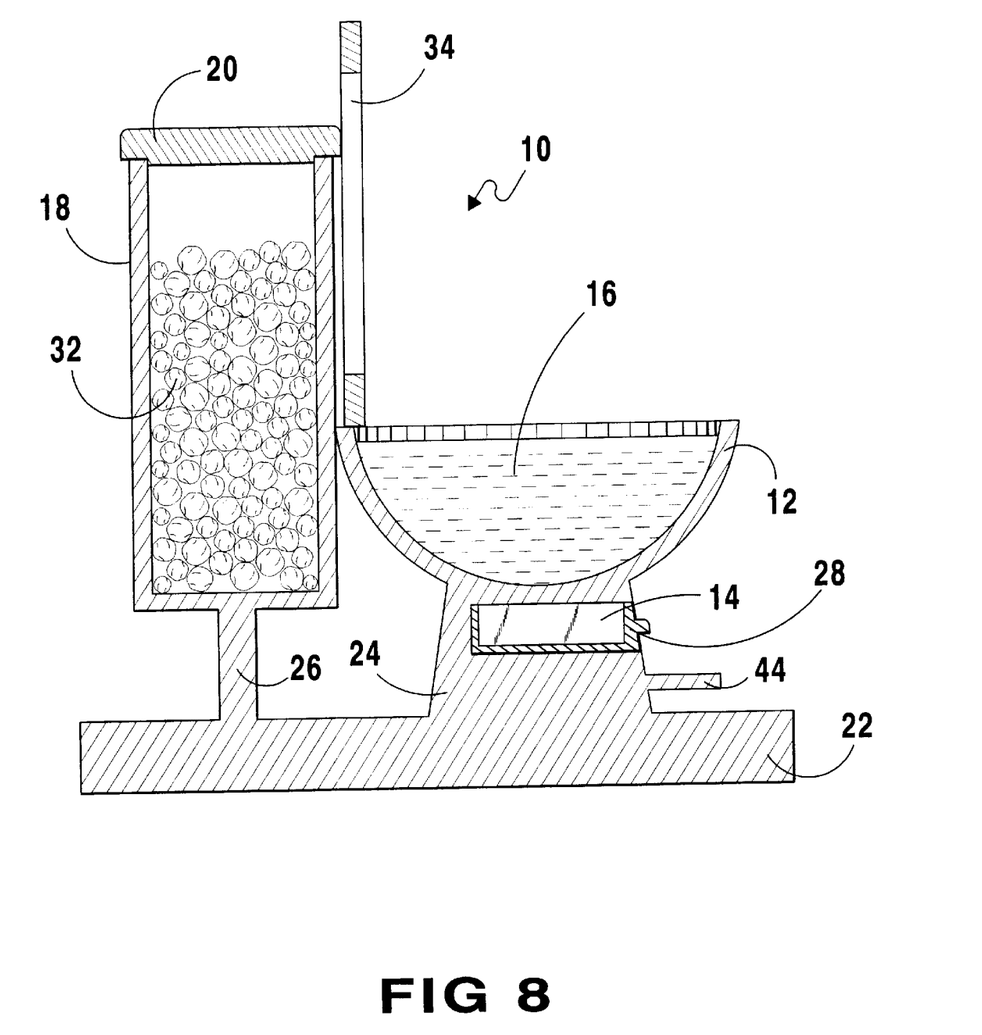
FIG. 8 is a cross sectional view of the alternate embodiment of the present invention, taken from FIG. 7 as indicated. Shown is a toilet bowl-like pet dish having a seat in an up position. Also said toilet-like pet dish having a compartment located therein whereby a drawer-like container can be inserted having a device located therein for varying the temperature of the bowl area. Also, shown is a tank area having a removable detachable cover having an amount of dry dog food contained there.

Turning to FIG. 8, shown therein is a cross sectional view of the alternate embodiment of the present invention 10, taken from FIG. 7 as indicated. Shown is a toilet bowl-like pet dish having a seat 34 in the upright, raised position. Also the toilet-like pet dish 12 has a compartment 14 located therein whereby a drawer-like container 28 can be inserted having a device located therein for varying the temperature of the bowl 12 area. Also, shown is a tank area 18 having a removable detachable cover 20 having an amount of dry dog food 32 contained therein. Other elements previously disclosed are also shown.

Figure 9:
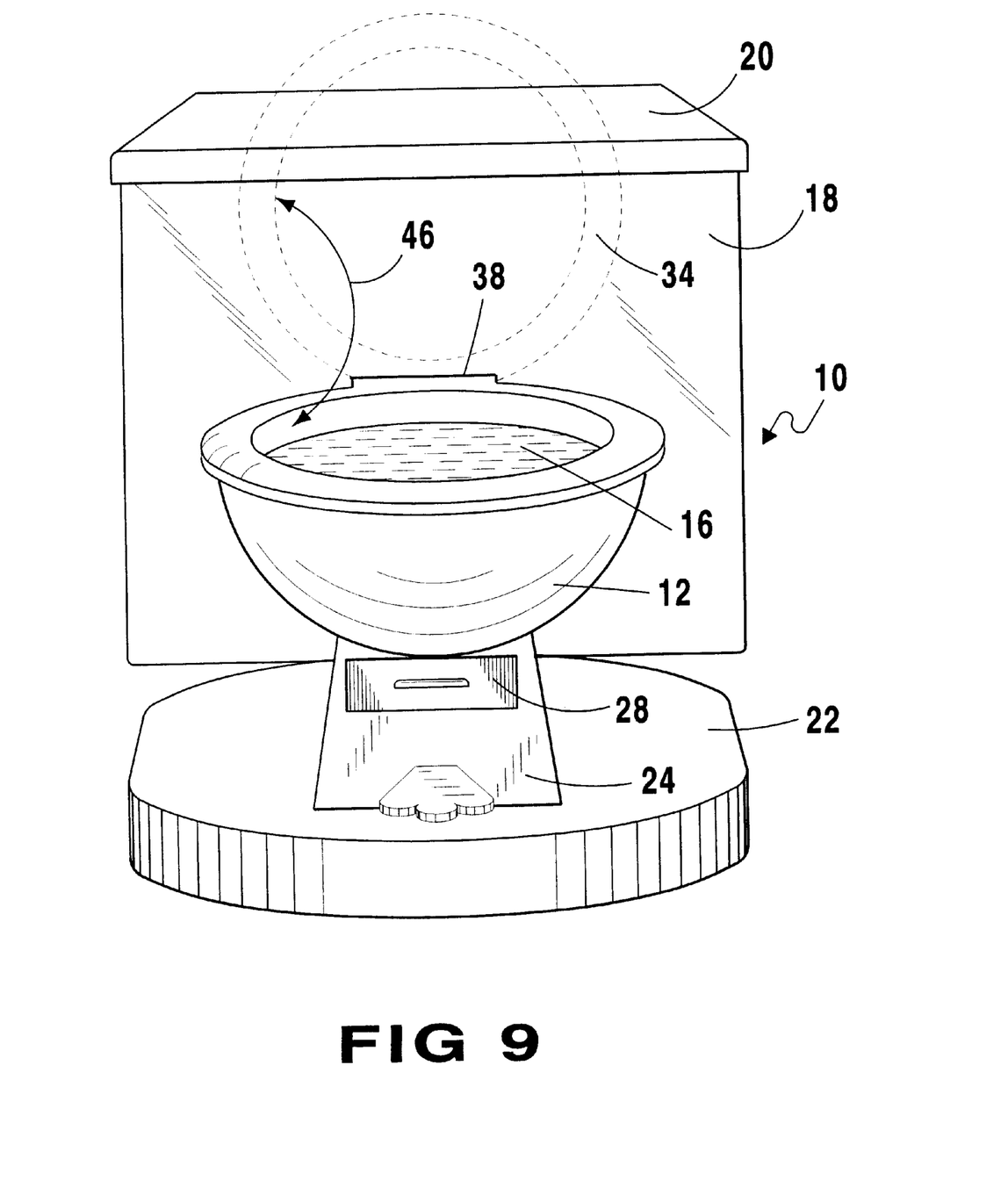
FIG. 9 is a front elevation of an additional embodiment of the present invention wherein the toilet seat is hingedly attached providing means for selectively positioning said toilet seat in an up or down position. Also shown is a pet watering dish having the appearance of a toilet bowl having a bowl area containing a liquid and a removable replaceable drawer-like compartment wherein a solid, liquid, or gel pack can be placed whereby the temperature of the liquid with the bowl area can be varied either higher or lower. Also shown is a toilet tank area which can be used to store additional pet related items.

Turning to FIG. 9, shown therein is a front elevation of an additional embodiment of the present invention 10 wherein the bowl seat 34 is hingedly attached providing means 38 for selectively positioning the toilet seat 34 in an up or down position as indicated by direction arrow 46. Also shown is a pet watering dish 12 having the appearance of a toilet bowl having a bowl area 12 containing a liquid 16 and a removable replaceable drawer-like compartment 28 wherein a solid, liquid, or gel pack can be placed whereby the temperature of the liquid with the bowl 12 area can be varied either higher or lower. Also shown is a toilet tank area 18 which can be used to store additional pet related items. Other elements previously disclosed are also shown.

What is claimed to be new and desired to be protected by Letters Patent is set forth in the appended claims.

I claim:

1. An apparatus for watering pets, comprising:
    a) a bowl;
    b) a seat disposed on the horizontal upper edge of said bowl, said seat extending around the periphery of said bowl;
    c) a base;
    d) a first support means mounted on said base and connected to said bowl for supporting said bowl;
    e) a tray frame having upwardly extending sides and end walls;
    f) a compartment having sides defined by said tray frame, said compartment disposed underneath said bowl, said compartment removably housing said tray frame;
    g) a generally upright standing tank disposed behind said bowl;
    h) a second support means mounted on said base and connected to said tank for supporting said tank;
    i) a storage compartment in said tank; and,
    j) a lid for said tank.

2. The apparatus of claim 1, further comprising means for a heat source for said bowl.

3. The apparatus of claim 2, said tray frame contiguous to said bowl, whereby heat can be transferred from said tray frame to said bowl.

4. The apparatus of claim 3, wherein said means for a heat source is disposed in said tray frame, whereby said bowl is heated.

5. The apparatus of claim 1, further comprising a source of cold for said bowl.

6. The apparatus of claim 1, wherein said tray frame is slidably insertable into said compartment.

7. The apparatus of claim 1, further comprising a handle on said tray frame, said handle for grasping to remove said tray frame from said compartment.

8. The apparatus of claim 1, wherein said seat is placed in the generally horizontal position.

9. The apparatus of claim 1, wherein said seat is placed in the generally vertical position.

10. The apparatus of claim 1, further comprising a hinge means on said seat.

11. The apparatus of claim 10, said hinge means disposed to the rear of said seat for raising and lowering said seat.

12. The apparatus of claim 1, further comprising a step disposed on said first support means whereby an animal can be positioned to be closer to said bowl.

13. The apparatus of claim 12, said step disposed to the front of said bowl.

14. The apparatus of claim 1, wherein said apparatus is made of ceramic.

15. The apparatus of claim 1, wherein said apparatus is made of plastic.

* * * * *